United States Patent
Sato et al.

(10) Patent No.: US 8,345,380 B2
(45) Date of Patent: Jan. 1, 2013

(54) SPIN TORQUE OSCILLATOR AND MAGNETIC RECORDING HEAD AND MAGNETIC RECORDING DEVICE MOUNTED WITH THE SPIN TORQUE OSCILLATOR

(75) Inventors: Yo Sato, Odawara (JP); Keiichi Nagasaka, Isehara (JP); Masato Shiimoto, Odawara (JP); Masato Matsubara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/208,384

(22) Filed: Aug. 12, 2011

(65) Prior Publication Data

US 2012/0069465 A1    Mar. 22, 2012

(30) Foreign Application Priority Data

Sep. 16, 2010   (JP) .................. 2010-208190

(51) Int. Cl.
*G11B 5/127*    (2006.01)
(52) U.S. Cl. ........................................ 360/110
(58) Field of Classification Search .............. 360/110
See application file for complete search history.

(56) References Cited

U.S. PATENT DOCUMENTS

| | | | | |
|---|---|---|---|---|
| 7,982,996 B2 * | 7/2011 | Smith et al. | ...................... | 360/59 |
| 8,154,825 B2 * | 4/2012 | Takashita et al. | ........ | 360/125.71 |
| 2009/0225465 A1 * | 9/2009 | Iwasaki et al. | .................. | 360/75 |
| 2010/0110592 A1 | 5/2010 | Koui et al. | | |
| 2010/0142088 A1 * | 6/2010 | Iwasaki et al. | ................ | 360/110 |
| 2010/0220415 A1 * | 9/2010 | Yamada et al. | ................ | 360/319 |
| 2010/0328799 A1 * | 12/2010 | Braganca et al. | ................ | 360/31 |
| 2011/0134561 A1 * | 6/2011 | Smith et al. | ..................... | 360/59 |
| 2011/0141629 A1 * | 6/2011 | Braganca et al. | ............. | 360/313 |
| 2011/0299192 A1 * | 12/2011 | Yamada et al. | ................. | 360/75 |

FOREIGN PATENT DOCUMENTS

| JP | 6-243527 A | 9/1994 |
|---|---|---|
| JP | 2010-113764 A | 5/2010 |

OTHER PUBLICATIONS

X. Zhu et al., Bias-Field-Free Microwave Oscillator Driven by Perpendicularly Polarized Spin Current, IEEE Transactions on Magnetics, vol. 42, No. 10, Oct. 2006.
J. Zhu et al., Microwave Assisted Magnetic Recording (MAMR), The Magnetic Recording Conference (TMRC) 2007 Paper B6, 2007.
J. Zhu et al., Microwave Assisted Magnetic Recording with Circular AC Field Generated by Spin Torque Transfer, MMM Conference 2008 Paper GA-02, 2008.

* cited by examiner

*Primary Examiner* — Mark Blouin
(74) *Attorney, Agent, or Firm* — Mattingly & Malur, PC

(57) ABSTRACT

The present invention provides a spin torque oscillator that can realize stable oscillation and has high reliability. A laminated structure including a first magnetic layer 1 having a bcc crystal structure and having in-plane magnetic anisotropy and a second magnetic layer 2 having perpendicular magnetic anisotropy laminated on the first magnetic layer 1 and including a multilayer film of Co and Ni is used.

18 Claims, 6 Drawing Sheets

Upper part

Lower part

SPIN TORQUE OSCILLATOR AND MAGNETIC RECORDING HEAD AND MAGNETIC RECORDING DEVICE MOUNTED WITH THE SPIN TORQUE OSCILLATOR

CLAIM OF PRIORITY

The present application claims priority from Japanese patent application JP 2010-208190 filed on Sep. 16, 2010, the content of which is hereby incorporated by reference into this application.

BACKGROUND OF THE INVENTION

1. Field of the Invention

The present application relates to a spin torque oscillator that stably oscillates at a high frequency and a magnetic recording head and a magnetic recording device including a spin torque oscillator for microwave assist recording that copes with high magnetic recording density.

2. Background Art

In recent years, spin electronics elements such as a TMR (Tunneling Magneto Resistance) head used in a read head of an HDD (Hard Disk Drive) and a spin injection MRAM (Magnetic Random Access Memory) have substantially contributed to the development of information technology. In a development process of such spin electronics elements, a spin torque oscillator that causes a magnetic body to oscillate using spin torque and generates a microwave, a spin torque diode effect for rectifying a high-frequency current, and the like were found. Possible applications of the spin electronics elements are further expanding to generation, detection, modulation, amplification, and the like of high-frequency waves. In particular, concerning an application of the spin torque oscillator to the HDD, the spin electronics elements attract a great deal of attention as means for attaining high recording density in the future. Concerning problems in an increase in recording density of the HDD and a method of solving the problems and attaining the high recording density, the background is explained more in detail.

According to the improvement of recording density of the HDD, microminiaturization of a bit size of recording media advances year after year. However, as the microminiaturization of the bit size advances, there is a more concern about a loss of a recording state due to thermal fluctuation. In order to solve such a problem and stably maintain a recording bit in high density recording in future, it is necessary to use a recording medium having large coercive force (i.e., large magnetic anisotropy). However, a strong recording magnetic field is necessary in order to perform recording in the recording medium having the large coercive force. However, actually, there is an upper limit in recording magnetic field intensity because of a reduction in width and size of a recording head and a limit in a usable magnetic material. Because of such reasons, the coercive force of the recording medium is restricted by the magnitude of a recording magnetic field that can be generated in the recording head. In order to meet conflicting requests of high thermal stability of a medium and coercive force for easy recording, recording methods of effectively reducing the coercive force of the recording medium only during recording using various assisting means have been devised. Thermal assist recording and the like for performing recording using both a magnetic head and heating means such as a laser are representatives of such recording methods.

On the other hand, there is also an idea for locally reducing the coercive force of the recording medium to perform recording by using a high-frequency magnetic field as a recording magnetic field from the recording head. For example, JP Patent Publication (Kokai) No. 6-243527 A (1994) discloses a technique for Joule-heating or magnetic-resonance-heating a magnetic recording medium with a high-frequency magnetic field and locally reducing medium coercive force to thereby record information. In such a recording method of using magnetic resonance of a high-frequency magnetic field and a magnetic head magnetic field (hereinafter referred to as microwave assist recording), since the magnetic resonance is used, in order to obtain a reduction effect of a reversal magnetic field, it is necessary to apply a large high-frequency magnetic field proportional to an anisotropic magnetic energy of a medium.

In recent years, like the spin torque oscillator, a generation principle for a high-frequency magnetic field using spin torque is proposed and possibility of the microwave assist recording is becoming realistic. For example, in X. Zhu and J. G. Zhu, "Bias-Field-Free Microwave Oscillator Driven by Perpendicularly Polarized Spin Current" IEEE TRANSACTIONS ON MAGNETIC, P2670 VOL. 42, NO. 10 (2006), a calculation result concerning a spin torque oscillator that oscillates without a bias magnetic field from the outside is disclosed. In J. G. Zhu and X. Zhu, 'Microwave Assisted Magnetic Recording,' The Magnetic Recording Conference (TMRC) 2007 Paper B6 (2007), a technique for arranging, near a magnetic recording medium adjacent to a main pole of a magnetic head, a magnetization high-speed rotor (Field Generation Layer: FGL), in which magnetization rotates at high speed with spin torque, to generate a microwave (a high-frequency magnetic field) and recording information in a magnetic recording medium having large magnetic anisotropy is disclosed. Further, in J. Zhu and Y. Wang, 'Microwave Assisted Magnetic Recording with Circular AC Field Generated by Spin Torque Transfer,' MMM Conference 2008 Paper GA-02 (2008), a spin torque oscillator that controls a circular polarization direction of an FGL using a magnetic field of a main pole adjacent to the FGL is proposed. This makes it possible to efficiently realize microwave assist magnetization reversal of a medium.

SUMMARY OF THE INVENTION

Characteristics required of an FGL included in a spin torque oscillator for microwave assist recording are considered to be large high-frequency magnetic field intensity, high oscillation frequency, large spin torque efficiency, and a stable oscillation characteristic.

Therefore, a structure for obtaining the stable oscillation characteristic was examined by simulation using an LLG (Landau-Lifshitz-Gilbert) equation. As a result of comparing oscillation characteristics concerning a first single magnetic layer having in-plane magnetic anisotropy used as an FGL and a laminated FGL obtained by laminating a second magnetic layer having perpendicular magnetic anisotropy on the first single magnetic layer, it was found that, in the structure including only the first magnetic layer, there were many conditions for an oscillation layer to change to multiple magnetic domains and conditions for the oscillation layer to stably oscillate were extremely narrow. On the other hand, it was found that, in the structure in which the second magnetic layer was laminated on the first magnetic layer, perpendicular magnetic anisotropy was induced in the first magnetic layer by the second magnetic layer and, as a result, the change to multiple magnetic domains of the first magnetic layer was suppressed and the oscillation layer easily oscillated stably. As a result of suppressing the change to the multiple magnetic domains, oscillation magnetic field intensity also increased. Because of such reasons, it was found that, in order to stably obtain large high-frequency magnetic field intensity, it was effective to form a layer having perpendicular magnetic anisotropy as a ferromagnetic layer adjacent to the first magnetic layer.

In order to obtain a large high-frequency magnetic field while stably oscillating, it is necessary to use a material having high saturation magnetic flux density Bs for the FGL layer or form a thick film. Non-Patent Literature 2 discloses, concerning a spin torque oscillator, a simulation result concerning an oscillation laminated structure including a configuration obtained by laminating two layers of an in-plane magnetic anisotropy FGL having Bs=2.5T and a perpendicular magnetization layer having perpendicular magnetic anisotropy of $1.5 \times 10^8$ erg/cm$^3$. However, there is no description concerning a specific material and a specific configuration for realizing calculation parameters except that it is mentioned that a CoFe material is desirably used in order to obtain high Bs. In FeCo (near Fe 65 at % and Co 35 at %) representative as a material actually having high Bs, a crystal structure of FeCo is a bcc structure. Therefore, it is difficult to develop large perpendicular magnetic anisotropy simply by laminating a Co based perpendicular magnetic anisotropy film basically having an fcc structure on FeCo having the bcc structure.

The present invention proposes, in an FGL, a specific material and a specific laminated configuration capable of developing large perpendicular magnetic anisotropy on an in-plane magnetization film of the bcc structure to provide a spin torque oscillator that can realize stable oscillation and has high reliability.

A mode of the present invention for solving the problems is a spin torque oscillator including a laminated structure including a first magnetic layer having a bcc crystal structure in an oscillation layer and having in-plane magnetic anisotropy and a second magnetic layer having perpendicular magnetic anisotropy laminated on the first magnetic layer and including a multilayer structure of Co and Ni.

According to the present invention, it is possible to provide a spin torque oscillator that can realize stable oscillation and has high reliability.

Problems, configurations, and effects other than those explained above will be made apparent by the following explanation of embodiments.

DETAILED DESCRIPTION OF THE PREFERRED EMBODIMENTS

Embodiments of the present invention are more specifically explained with reference to the drawings and tables.

[First Embodiment]

Figure 1:
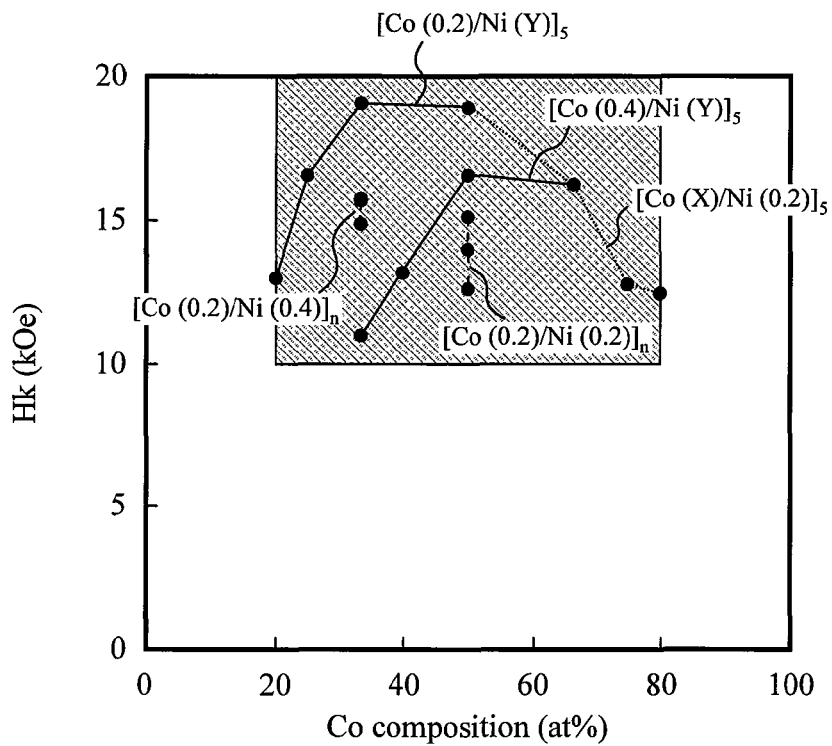
FIG. 1 is a diagram showing a relation between a Co composition of a $[Co(X)/Ni(Y)]_n$ multilayer film and Hk.

FIG. 1 is a diagram showing a result obtained by evaluating, concerning various configurations of a $[Co(0.2$ to $0.8)/Ni(0.2$ to $0.8)]_{n=5-20}/Pt(5)/Ta(3)$/glass substrate, an anisotropic magnetic field Hk from a magnetization curve using a vibrating sample magnetometer (VSM) after applying heat treatment to a solid film at 250° C. for three hours. Numerical values in parentheses are film thickness indicated in an nm unit. "n" represents the number of laminations of [Co/Ni]. A Co composition on the abscissa is a ratio of Co and Ni formed as a film converted into at %. It is seen from this result that, when an average composition of Co in a magnetic film is in a composition range of 20 at %$\leq$CO$\leq$30 at % and the number of laminations is $5 \leq n \leq 20$, at least $[Co(0.2$ to $0.8)/Ni((0.2$ to $0.8)]_{n=5-20}$ is a perpendicular magnetization film having Hk$\leq$10 kOe. When $[Co/Ni]_n$ is considered an integral magnetic layer, the average composition is defined by a ratio of Co in the magnetic layer.

Figure 2:
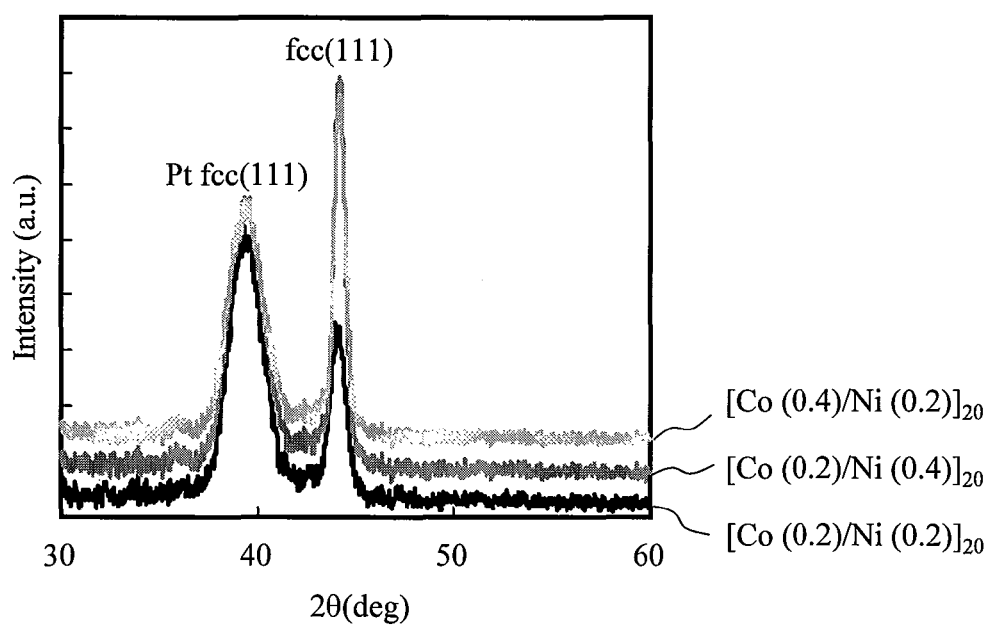
FIG. 2 is a diagram showing an XRD profile of the $[Co(X)/Ni(Y)]_n$ multilayer film.

In FIG. 2, an X-ray diffraction (XRD) measurement result of a formed film at the time when a representative composition is $[Co(X)/Ni(Y)]_{20}$:(X,Y)=(0.2, 0.4)(0.4, 0.2)(0.2, 0.2). It is seen from this result that $[Co(X)/Ni(Y)]_{20}$ is fcc(111)-oriented on fcc(111)-oriented Pt.

Figure 3:
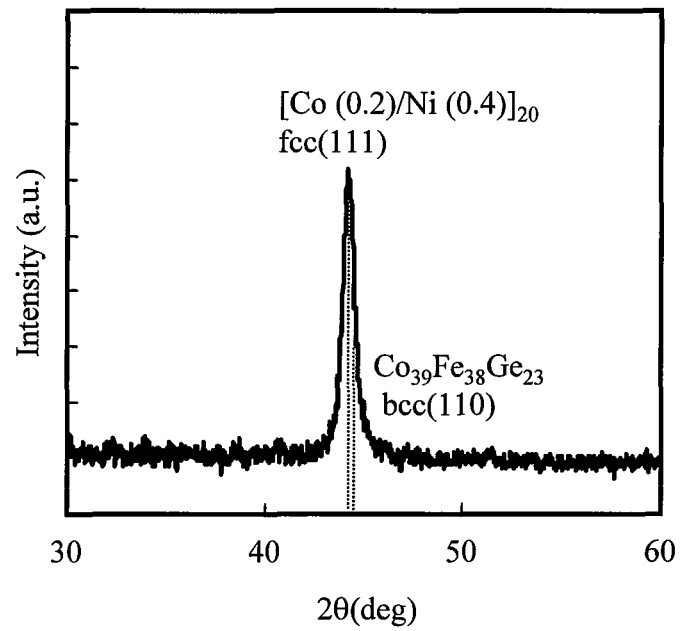
FIG. 3 is a diagram showing an XRD profile of a $[Co(0.2)/Ni(0.4)]_{20}$ film formed on CoFeGe, which is a bcc crystal structure material.

In FIG. 3, a result obtained by forming a Ta(3)/$[Co(0.2)/Ni(0.4)]_{20}/CO_{39}Fe_{38}Ge_{23}(6)/Ta(3)$/glass substrate and performing XRD measurement is shown. It is seen from this result that a $[Co/Ni]_{20}$ multilayer film maintains fcc(111) orientation even on bcc(110)-oriented $CO_{39}Fe_{38}Ge_{23}$. In this way, if the fcc(111) orientation is maintained, perpendicular magnetic anisotropy can be induced on the bcc configuration.

Figure 4:
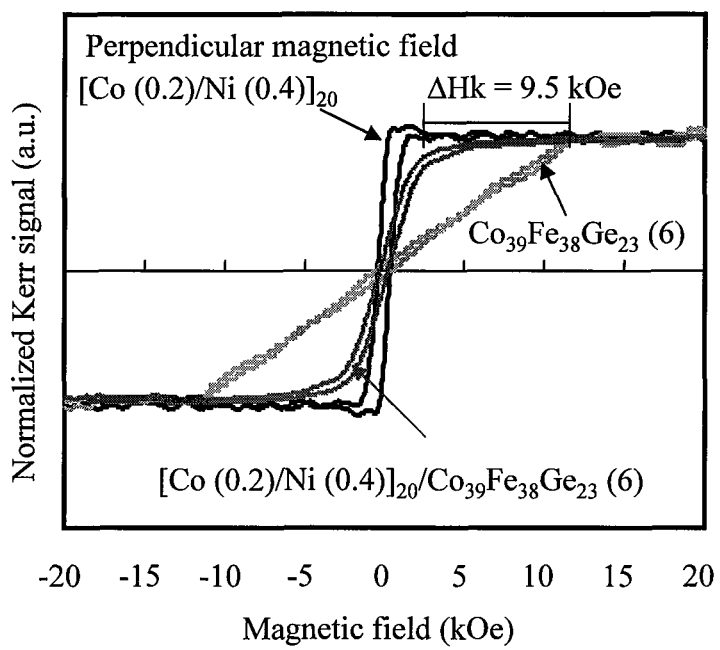
FIG. 4 is a diagram showing a magnetization curve in a perpendicular magnetic field direction indicating that perpendicular magnetic anisotropy is induced in CoFeGe.

In FIG. 4, a result obtained by measuring, using a Kerr effect, a magnetization curve in a perpendicular direction of a sample created in FIG. 3 is shown. According to this result, it is seen that, when a $[Co(0.2)/Ni(0.4)]_{20}$ film is formed on $CO_{39}Fe_{38}Ge_{23}$, an external magnetic field for $CO_{39}Fe_{38}Ge_{23}$ to overcome a demagnetizing field and saturate in the vertical direction decreases by 9.5 kOe. Therefore, it can be said that $[Co(0.2)/Ni(0.4)]_{20}$ is formed on a bcc magnetic material as a perpendicular magnetization film and induces perpendicular magnetic anisotropy of 9.5 kOe in $CO_{39}Fe_{38}Ge_{23}$.

Similarly, in all configurations of $[Co(0.2$ to $0.8)/Ni(0.2$ to $0.8)]_{n=5-20}$, perpendicular magnetic anisotropy can be induced in $CO_{39}Fe_{38}Ge_{23}$. Consequently, it can be said that $[Co(0.2$ to $0.8)/Ni(0.2$ to $0.8)]_{n=5-20}$ is a perpendicular magnetization film on the bcc magnetic material in a composition range of at least 20 at %$\leq$Co$\leq$80 at %.

Similarly, ΔHk obtained when $[Co(0.2)/Ni(0.4)]_{20}$ is formed as a second magnetic layer on various first magnetic layers is tabulated in Table 1. An upward arrow in Table 1 indicates that a configuration is the same as a configuration right above the configuration.

TABLE 1

| First magnetic layer | Second magnetic layer | ΔHk (kOe) |
|---|---|---|
| $Fe_{50}Co_{50}$ 6 nm | $[Co (0.2)/Ni (0.4)]_{20}$ | 6.2 |
| $Fe_{85}Ni_{15}$ 6 nm | ↑ | 5.0 |
| $Co_{39}Fe_{38}Ge_{23}$ 6 nm | ↑ | 9.5 |
| $Co_{41}Fe_{39}Si_{20}$ 6 nm | ↑ | 8.5 |
| $Co_{41}Fe_{38}Al_{21}$ 6 nm | ↑ | 7.0 |
| $Co_{51}Mn_{24}Ge_{25}$ 6 nm | ↑ | 9.2 |
| $Co_{52}Mn_{23}Si_{25}$ 6 nm | ↑ | 9.5 |
| $Co_{50}Mn_{24}Al_{26}$ 6 nm | ↑ | 8.5 |
| $Fe_{50}Co_{50}$ 3 nm/ $Co_{39}Fe_{38}Ge_{23}$ 3 nm | ↑ | 7.1 |
| $Fe_{50}Co_{50}$ 3 nm/ $Co_{41}Fe_{38}Al_{21}$ 3 nm | ↑ | 7.5 |
| $Fe_{50}Co_{50}$ 3 nm/ $Co_{51}Mn_{24}Ge_{25}$ 3 nm | ↑ | 7.8 |

According to Table 1, it is seen that Hk can be induced when a FeCo, FeNi, CoFeGe, CoFeSi, CoFeAl, CoMnGe, CoMnSi, or CoMnAl single layer film is used as a first magnetic layer adopting a bcc crystal structure and having in-plane magnetic anisotropy and when a laminated configuration of FeCo/CoFeGe, FeCo/CoFeAl, or FeCo/CoMnGe is used. Further, the same effect is obtained when the first magnetic layer is a combination of materials called a Heusler alloy such as CoFeSn or CoMnZ (Z=Al, Si, Ge, Sn). When the combination of the materials used in the Heusler alloy is used, large spin torque efficiency can be obtained even if a stoichiometry composition is not always adopted.

As the second magnetic field, besides the multilayer film of Co and Ni, an alloy having perpendicular magnetic anisotropy obtained by adding Pt or Pd to CoNi as a third element or a structure having perpendicular magnetic anisotropy including a CoNi alloy and a multilayer film of Pt or Pd. Table 2 shows configuration examples of the first and second magnetic layers and Hk induced in the first magnetic layer. The saturation magnetic flux density Bs and the anisotropic magnetic field Hk of the second magnetic field can be controlled by adding Pt or Pd. A desired characteristic can be obtained by changing a composition of Pt or Pd according to the design of the spin torque oscillator. An upward arrow in Table 2 indicates that a configuration is the same as a configuration right above the configuration.

TABLE 2

| First magnetic layer | Second magnetic layer | ΔHk (kOe) |
|---|---|---|
| $Co_{39}Fe_{38}Ge_{23}$ 6 nm | $Co_{38}Ni_{37}Pt_{25}$ | 2.5 |
| ↑ | $Co_{10}Ni_{23}Pd_{67}$ | 1.9 |
| ↑ | $[Co_{50}Ni_{50} (0.4)/Pt(0.2)]_{10}$ | 3.5 |
| ↑ | $[Co_{30}Ni_{70} (0.4)/Pd(0.8)]_{10}$ | 2.8 |

[Second Embodiment]

Figure 5:
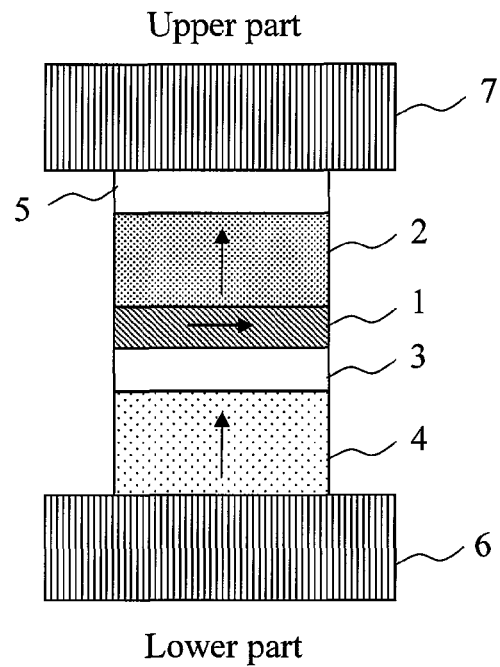
FIG. 5 is a diagram showing a specific configuration example of a spin torque oscillator.

A specific configuration example of the spin torque oscillator including the first magnetic layer and the second magnetic layer described in the first embodiment is shown in FIG. 5.

FIG. 5 is a configuration obtained by laminating a magnetization fixed layer 4, a nonmagnetic intermediate layer 3, a first magnetic layer 1, a second magnetic layer 2, a cap layer 5, and an trailing shield 7 in order on a main pole 6. As a material of the main pole 6 in this configuration, it is desirable to use a high Bs material based on CoFe in order to obtain large recording magnetic field intensity. The magnetization fixed layer 4 laminated on the main pole 6 is a spin torque source. Therefore, it is necessary to suppress fluctuation in magnetization due to spin torque. Alloys and multilayer films such as CoPt, CoCrPt, CoPd, FePt, CoFePd, TbFeCo, and Co/Ni having perpendicular magnetic anisotropy can be used. A magnetization direction can be fixed perpendicular to a film surface using a leakage magnetic field from the main pole 6 to the trailing shield 7. In that case, an in-plane magnetization film may be used besides a film having perpendicular magnetic anisotropy. However, when the in-plane magnetization film is used, from the viewpoint of spin torque tolerance, it is desirable to set [saturation magnetic flux density Bs×film thickness t] of the magnetization fixed layer 4 to be equal to or larger than a double of that of the first magnetic layer 1. In particular, from the viewpoint of improving spin injection efficiency, a Heusler alloy, CoFeB, or the like is desirable as the in-plane magnetization film used as the magnetization fixed layer 4.

As the nonmagnetic intermediate layer 3, when a spin torque oscillator employing CPP-GMR is formed, a metal material such as Au, Ag, or Cu having long spin diffusion length can be used. A spin torque oscillator employing TMR can also be configured. In that case, as the nonmagnetic intermediate layer 3, it is desirable to form an insulating layer of $Al_2O_3$, MgO, ZnO, or the like in which a large spin dependent tunneling phenomenon can be expected.

As the first magnetic layer 1, a binary alloy including FeX (X=Co, Ni), a tertiary alloy including CoFeZ (Z=Al, Si, Ge, Sn) or a tertiary alloy including CoMnZ (Z=Al, Si, Ge, Sn), and a structure obtained by laminating the binary alloy and the tertiary alloy can be used.

As the second magnetic layer 2, an alloy having perpendicular magnetic anisotropy added with Pt or Pd as a third element besides Co and Ni or a structure having perpendicular magnetic anisotropy including a multilayer film can also be used.

The cap layer 5 is a layer for suppressing process damage to the spin torque oscillator and cutting magnetic coupling of the trailing shield 7 and the second magnetic layer 2. This layer is desirably a nonmagnetic material having low electric resistance. Candidates of the layer include single layers of Au, Ag, Cu, Ru, Ir, Pd, and Ta or a laminated configuration of these elements. The trailing shield 7 is necessary to make a magnetic field gradient of the main pole 6 steep. However, when the high-frequency magnetic field intensity of the spin torque oscillator is sufficiently high, the trailing shield 7 is not always necessary.

Figure 6:
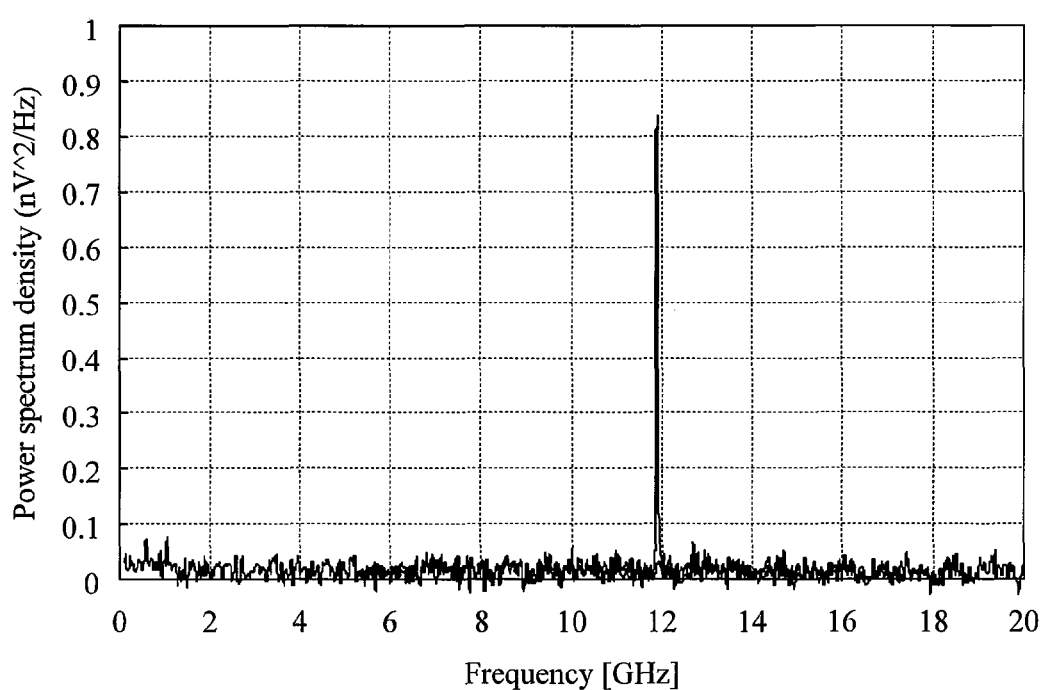
FIG. 6 is a graph showing an FMR characteristic in the specific configuration example of the spin torque oscillator.

In FIG. 6, a ferromagnetic resonance (FMR) characteristic electrically measured in a spin torque oscillator including 6 nm $CO_{39}Fe_{38}Ge_{23}$ as the first magnetic layer 1, including $[Co(0.2)/Ni(0.4)]_{18}$ as the second magnetic layer 2, and including $[Co(0.2)/Ni(0.4)]_{20}$ as the magnetization fixed layer 4 is shown. An electric current flows from the magnetization fixed layer 4 in the direction of the first magnetic layer 1. By evaluating the FMR characteristic, an oscillation frequency of an FGL is known from a peak position of the FMR characteristic. Narrow half width of the peak means that an effective damping constant is small. In a situation in which the half width is the smallest, steady precession of the FGL occurs. It is considered that the manufactured spin torque oscillator has an oscillation peak near 12 GHz and, because of the narrow half width, the steady precession, i.e., stable oscillation occurs.

The above explanation is on the premise that the spin torque oscillator is mounted on a magnetic recording head of a microwave assist recording system. However, an application of the spin torque oscillator is not limited to the magnetic recording head. For example, the spin torque oscillator can also be used as a spin torque diode that frequency-selectively rectifies a high-frequency current or can also be applied to a high-sensitivity magnetic field detection element or the like that reads a change in an external magnetic field as a change in an FMR frequency at high sensitivity. In that case, the main pole 6 and the trailing shield 7 shown in FIG. 5 are unnecessary. The layers from the magnetization fixed layer 4 to the cap layer 5 are incorporated in an electric circuit, whereby the spin torque oscillator operates.

[Third Embodiment]

Figure 7:
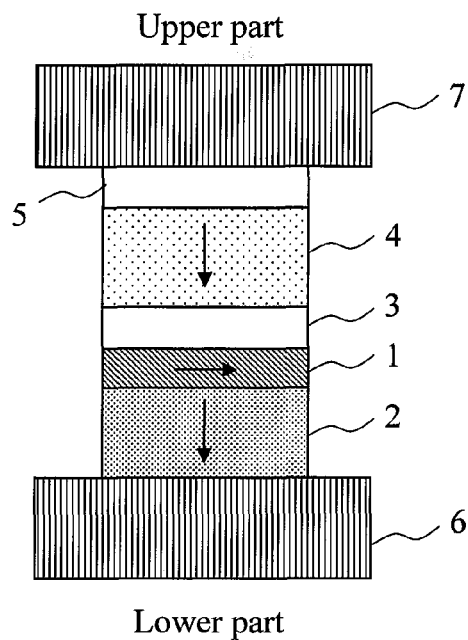
FIG. 7 is a diagram showing a specific configuration example of the spin torque oscillator.

In FIG. 7, another specific configuration example of the spin torque oscillator including the first magnetic layer and the second magnetic layer explained in the first embodiment is shown.

FIG. 7 is a configuration in which the second magnetic layer 2, the first magnetic layer 1, the non-magnetic intermediate layer 3, the magnetization fixed layer 4, the cap layer 5, and the trailing shield 7 are laminated in order on the main pole 6. As a material of the main pole 6 of this configuration, it is desirable to use a high Bs material based on CoFe in order to obtain large recording magnetic field intensity. As the second magnetic layer 2 laminated on the main pole 6, an alloy having perpendicular magnetic anisotropy added with Pt or Pd as a third element besides Co and Ni or a structure having perpendicular magnetic anisotropy including a multi-layer film can be used.

In this case, since the material of the main pole 6 has a bcc crystal structure based on CoFe, a magnetic characteristic of the second magnetic layer 2 indicates a characteristic equivalent to a characteristic of the second magnetic layer 2 formed on the first magnetic layer 1 explained in the first embodiment.

In this example, as the first magnetic layer 1 formed on the second magnetic layer 2, a binary alloy including FeX (X=Co, Ni), a tertiary alloy including CoFeZ (Z=Al, Si, Ge, Sn) or a tertiary alloy including CoMnZ (Z=Al, Si, Ge, Sn), and a structure obtained by laminating the binary alloy and the tertiary alloy can be used.

As the nonmagnetic intermediate layer 3, when a spin torque oscillator employing CPP-GMR is formed, a metal material such as Au, Ag, or Cu having long spin diffusion length can be used. A spin torque oscillator employing TMR can also be configured. In that case, as the nonmagnetic intermediate layer 3, it is desirable to form an insulating layer of $Al_2O_3$, MgO, ZnO, or the like in which a large spin dependent tunneling phenomenon can be expected.

The magnetization fixed layer 4 is a spin torque source. Therefore, it is necessary to suppress fluctuation in magnetization due to spin torque. Alloys and multilayer films such as CoPt, CoCrPt, CoPd, FePt, CoFePd, TbFeCo, and Co/Ni having perpendicular magnetic anisotropy can be used. A magnetization direction can be fixed perpendicular to a film surface using a leakage magnetic field from the main pole 6 to the trailing shield 7. In that case, an in-plane magnetization film may be used besides a film having perpendicular magnetic anisotropy. However, when the in-plane magnetization film is used, from the viewpoint of spin torque tolerance, it is desirable to set [saturation magnetic flux density Bs×film thickness t] of the magnetization fixed layer 4 to be equal to or larger than a double of that of the first magnetic layer 1. In particular, from the viewpoint of improving spin injection efficiency, a Heusler alloy, CoFeB, or the like is desirable as the in-plane magnetization film used as the magnetization fixed layer 4.

The cap layer 5 is a layer for suppressing process damage to the spin torque oscillator and cutting magnetic coupling of the trailing shield 7 and the magnetization fixed layer 4. This layer is desirably a nonmagnetic material having low electric resistance. Candidates of the layer include single layers of Au, Ag, Cu, Ru, Ir, Pd, and Ta or a multilayer structure including these plural materials. The trailing shield 7 is necessary to make a magnetic field gradient of the main pole 6 steep. However, when the high-frequency magnetic field intensity of the spin torque oscillator is sufficiently high, the trailing shield 7 is not always necessary.

Figure 8:
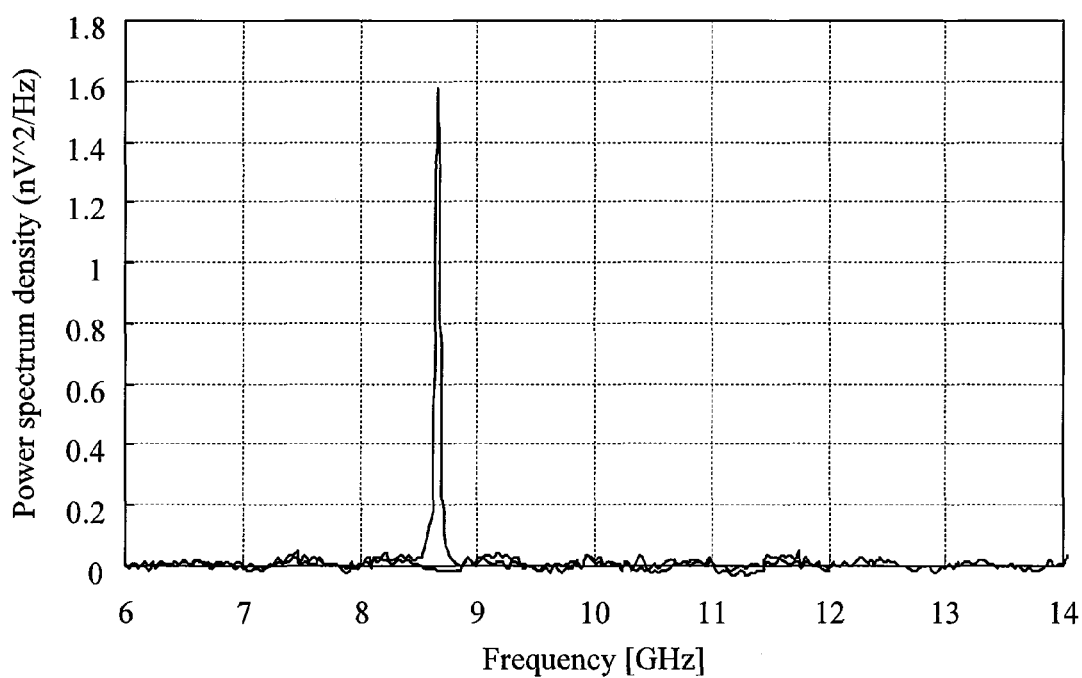
FIG. 8 is a graph showing an FMR characteristic in the specific configuration example of the spin torque oscillator.

In FIG. 8, an FMR characteristic of a spin torque oscillator including 6 nm $CO_{39}Fe_{38}Ge_{23}$ as the first magnetic layer 1, including $[Co(0.2)/Ni(0.4)]_{18}$ as the second magnetic layer 2, and including $[Co(0.2)/Ni(0.4)]_{20}$ as the magnetization fixed layer 4 is shown. An electric current flows from the magnetization fixed layer 4 in the direction of the first magnetic layer 1. It is considered that the manufactured spin torque oscillator has an oscillation peak near 8.7 GHz and, because of the steep half width, the steady precession, i.e., stable oscillation occurs.

The spin torque oscillator in this example can be mounted on a magnetic recording head of a microwave assist recording system. In that case, the main pole 6 is a magnetic pole that generates a recording magnetic field. An application of the spin torque oscillator is not limited to the magnetic recording head and is not limited to a magnetic recording head. For example, the spin torque oscillator can also be used as a spin torque diode that frequency-selectively rectifies a high-frequency current or can also be applied to a high-sensitivity magnetic field detection element or the like that reads a change in an external magnetic field as a change in an FMR frequency at high sensitivity. In that case, the main pole 6 and the trailing shield 7 shown in FIG. 7 are unnecessary. The layers from the magnetization fixed layer 4 to the cap layer 5 are incorporated in an electric circuit, whereby the spin torque oscillator operates.

[Fourth Embodiment]

Figure 9:
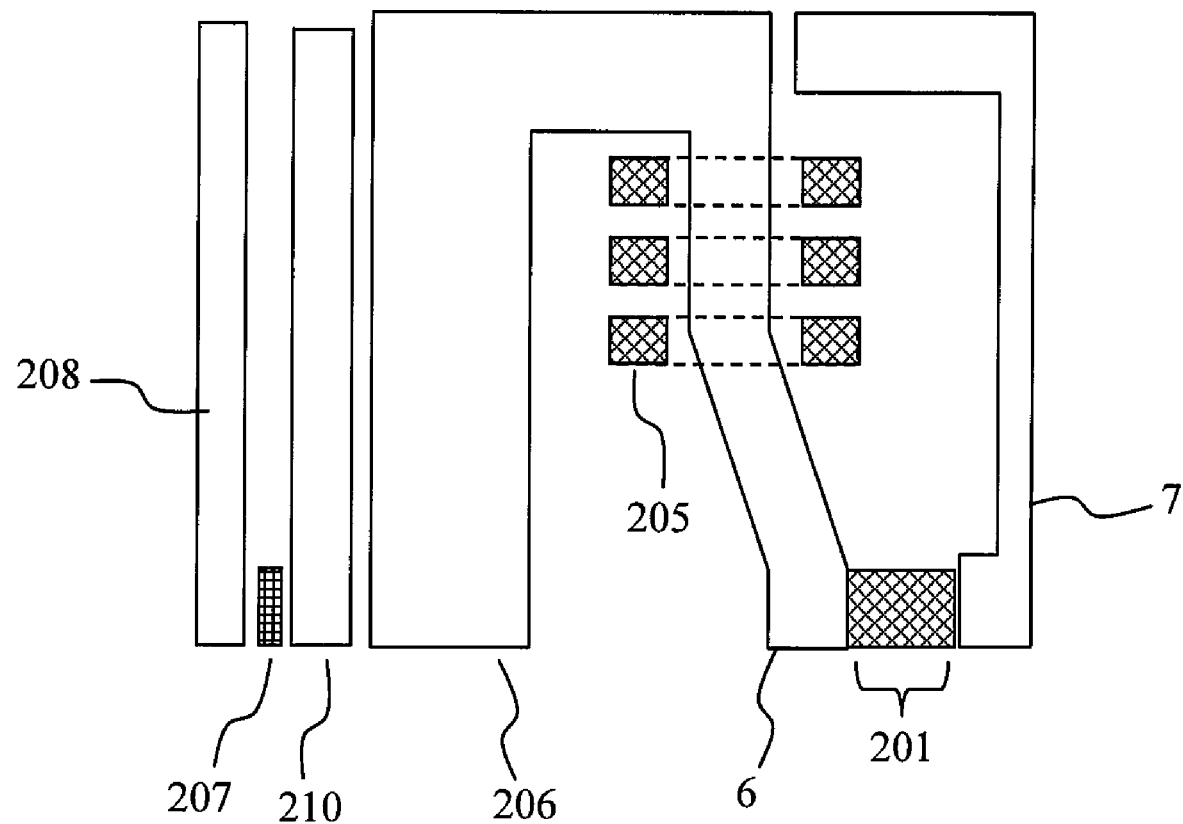
FIG. 9 is a schematic diagram showing an example of a magnetic head mounted with the spin torque oscillator.

FIG. 9 is an enlarged sectional view of a magnetic head mounted with the spin torque oscillator explained in the first to third embodiments. The magnetic head includes a recording head section and a read head section. The recording head section includes an return pole 206, a spin torque oscillator 201 arranged between the main pole 6 and the trailing shield 7, and a coil 205 that excites the main pole 6. A recording magnetic field is generated from the main pole 6. The read head section includes a read sensor 207 arranged between a lower shield 208 and an upper shield 210. Although not shown in the figure, an excitation current of the coil 205, a driving current of the read sensor 207, and an applied current to a high-frequency magnetic field generating element are supplied by current supply terminals provided for the respective components.

As shown in FIG. 9, the trailing shield 7 extends to the main pole 6 in an upper part in the element height direction and configures a magnetic circuit in conjunction with the main pole 6. However, the trailing shield 7 is electrically insulated in the upper part in the element height direction. As a result, a series electric circuit is formed from the main pole 6 to the trailing shield 7 via the spin torque oscillator 201. Therefore, it is possible to feed an electric current necessary for spin torque oscillation to the spin torque oscillator 201 by connecting electrodes to the main pole 6 and the trailing shield 7.

[Fifth Embodiment]

Figure 10A:
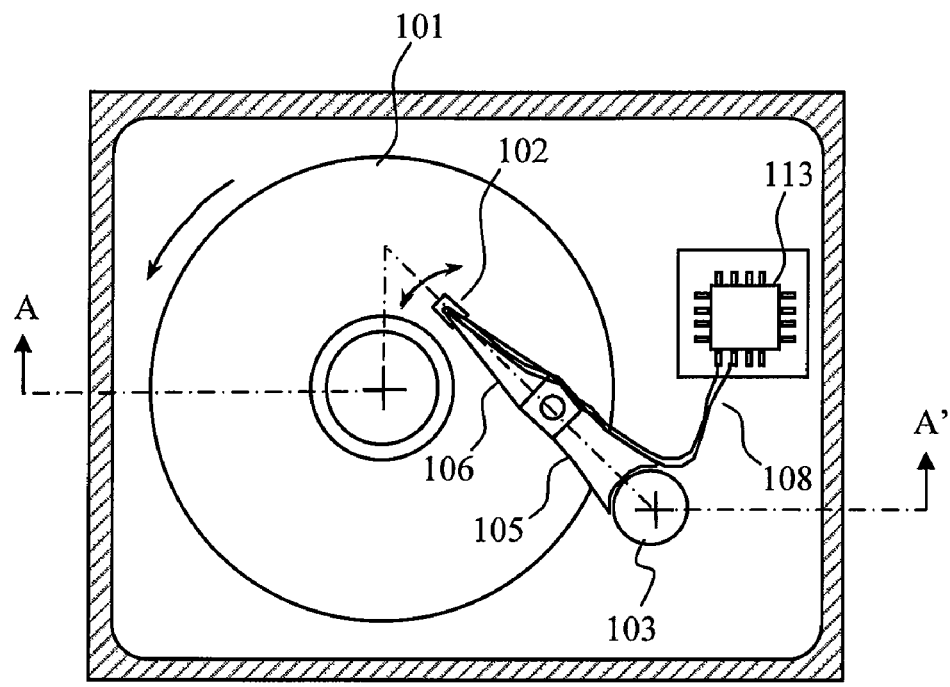
FIGS. 10A and 10B are overall diagrams of a hard disk drive.
Figure 10B:
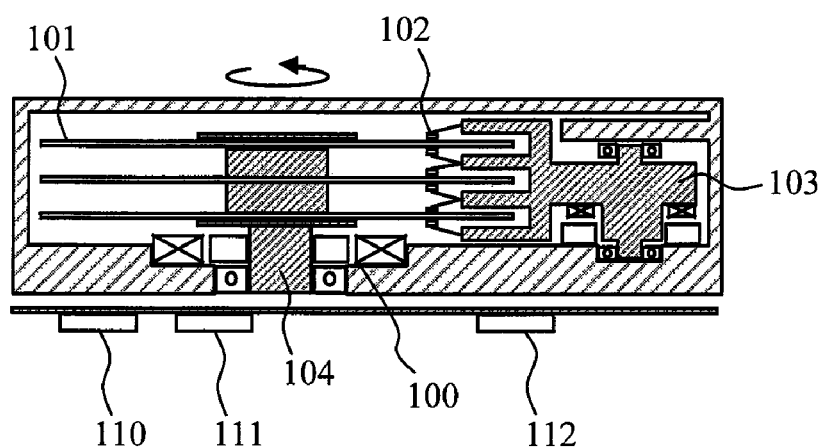

A magnetic recording and reproducing device is configured with the magnetic head explained in the fourth embodiment and a magnetic recording medium incorporated therein. FIGS. 10A and 10B are schematic diagrams showing an overall configuration of the magnetic recording and reproducing device according to this embodiment. FIG. 10A is a top view and FIG. 10B is a sectional view taken along A-A' in FIG. 10A. The magnetic recording medium (a magnetic disk)

101 is fixed to a rotation bearing 104 and rotated by a motor 100. In FIGS. 10A and 10B, an example of the magnetic recording and reproducing device mounted with three magnetic disks and six magnetic heads is shown. However, the magnetic recording and reproducing device only has to include one or more magnetic disks and one or more magnetic heads. The magnetic recording medium 101 is formed in a disc shape. Recording layers are formed on both the surfaces thereof. A slider 102 moves in a substantially radial direction on a rotating recording medium. The slider 102 has a magnetic head at the distal end thereof. A suspension 106 is supported by a rotary actuator 103 via an arm 105. The suspension 106 has a function of pressing the slider 102 against the magnetic recording medium 101 with a predetermined load and separating the slider 102 from the magnetic recording medium 101. The arm 105 is driven by the rotary actuator 103, whereby the magnetic head mounted on the slider 102 is positioned in a desired track on the magnetic recording medium 101.

An electric current for driving components of the magnetic head is supplied from an IC amplifier 113 via a wire 108. Processing of a recording signal supplied to a recording head unit and a read signal detected from a read head unit is executed by a channel IC 112 for read write. A control operation for the entire magnetic recording and reproducing device is realized by a processor 110 executing a program for disk control stored in the memory 111. Therefore, in the case of this embodiment, the processor 110 and the memory 111 configure a so-called disk controller.

Concerning the configuration explained above, as a result of testing the magnetic head and the magnetic recording and reproducing device mounted with the magnetic head according to the present invention, the magnetic head and the magnetic recording and reproducing device exhibited a sufficient output and high recording density. Reliability of operations was satisfactory.

The present invention is not limited to the embodiments explained above and includes various modifications. For example, the embodiments are explained in detail to facilitate understanding of the present invention and are not always limited to embodiments including all the components explained above.

DESCRIPTION OF SYMBOLS

| | |
|---|---|
| 1 | first magnetic layer |
| 2 | second magnetic layer |
| 3 | nonmagnetic intermediate layer |
| 4 | magnetization fixed layer |
| 5 | cap layer |
| 6 | main pole |
| 7 | trailing shield |
| 100 | motor |
| 101 | recording medium |
| 102 | slider |
| 103 | rotary actuator |
| 104 | rotation bearing |
| 105 | arm |
| 106 | suspension |
| 108 | wire |
| 110 | processor |
| 111 | memory |
| 112 | channel IC |
| 113 | IC amplifier |
| 201 | spin torque oscillator |
| 205 | coil |
| 206 | return pole |

-continued

| | |
|---|---|
| 207 | read sensor |
| 208 | lower shield |
| 210 | upper shield |

What is claimed is:

1. A spin torque oscillator comprising:
a field generation layer including a first magnetic layer having a bcc crystal structure and having in-plane magnetic anisotropy, and a second magnetic layer having perpendicular magnetic anisotropy disposed on the first magnetic layer and including a multilayer film of Co and Ni.

2. A spin torque oscillator comprising:
a magnetic pole having a bcc crystal structure and having in-plane magnetic anisotropy; and
a field generation layer including:
a first magnetic layer having a bcc crystal structure and having in-plane magnetic anisotropy, and a second magnetic layer having perpendicular magnetic anisotropy disposed on the magnetic pole and including a multilayer film of Co and Ni, where the first magnetic layer is disposed on the second magnetic layer.

3. The spin torque oscillator according to claim 1, wherein a binary alloy including FeX (X=Co, Ni) is used as the first magnetic layer.

4. The spin torque oscillator according to claim 1, wherein a tertiary alloy including CoFeZ (Z=Al, Si, Ge, Sn) is used as the first magnetic layer.

5. The spin torque oscillator according to claim 1, wherein a tertiary alloy including CoMnZ (Z=Al, Si, Ge, Sn) is used as the first magnetic layer.

6. The spin torque oscillator according to claim 1, wherein a laminated film formed by laminating plural alloys selected from a group of a binary alloy including FeX (X=Co, Ni), a tertiary alloy including CoFeZ (Z=Al, Si, Ge, Sn), and a tertiary alloy including CoMnZ (Z=Al, Si, Ge, Sn) is used as the first magnetic layer.

7. The spin torque oscillator according to claim 1, wherein an average composition of the second magnetic layer is in a range of 20 at $\% \leqq Co \leqq 80$ at %.

8. The spin torque oscillator according to claim 1, wherein an alloy having perpendicular magnetic anisotropy obtained by adding Pt or Pd to CoNi as a third element or a multilayer film of a CoNi alloy and Pt or Pd is used as the second magnetic layer instead of the multilayer film of Co and Ni.

9. A microwave assisted magnetic recording head comprising:
a magnetic pole that generates a recording magnetic field; and
a spin torque oscillator that generates a high-frequency magnetic field, where the spin torque oscillator has a field generation layer including: a first magnetic layer having a bcc crystal structure and having in-plane magnetic anisotropy, and a second magnetic layer having perpendicular magnetic anisotropy disposed on the first magnetic layer and including a multilayer film of Co and Ni.

10. A magnetic recording device comprising:
a magnetic recording medium;
a medium driving unit that drives the magnetic recording medium;
a magnetic head that applies a recording operation to the magnetic recording medium; and
a head driving unit that positions the magnetic head in a desired track of the magnetic recording medium, wherein the magnetic head includes a magnetic pole that generates a recording magnetic field and a spin torque oscillator, and wherein the spin torque oscillator has a field generation layer including a first magnetic layer having a bcc crystal structure and having in-plane magnetic anisotropy, and a second magnetic layer having perpendicular magnetic anisotropy disposed on the first magnetic layer and including a multilayer film of Co and Ni.

11. The spin torque oscillator according to claim 1, further comprising:
a pair of electrodes which sandwich the first magnetic layer and the second magnetic layer.

12. The spin torque oscillator according to claim 2, further comprising:
a pair of electrodes which sandwich the first magnetic layer and the second magnetic layer.

13. The microwave assisted magnetic recording head according to claim 9, wherein the spin torque oscillator includes a pair of electrodes which sandwich the first magnetic layer and the second magnetic layer.

14. The magnetic recording device according to claim 10, wherein the spin torque oscillator includes a pair of electrodes which sandwich the first magnetic layer and the second magnetic layer.

15. The spin torque oscillator according to claim 1, further comprising:
a magnetization fixed layer on which the field generation layer is disposed.

16. The spin torque oscillator according to claim 2, further comprising:
a magnetization fixed layer on which the field generation layer is disposed.

17. The microwave assisted magnetic recording head according to claim 9, wherein the spin torque oscillator includes a magnetization fixed layer on which the field generation layer is disposed.

18. The magnetic recording device according to claim 10, wherein the spin torque oscillator includes a magnetization fixed layer on which the field generation layer is disposed.

* * * * *